(12) United States Patent
Vlad

(10) Patent No.: US 11,873,941 B2
(45) Date of Patent: Jan. 16, 2024

(54) FLEXIBLE PIPING AND PROCESS FOR CAPTURING ACCIDENTAL PRESSURIZED FLUID LEAKS FROM A DAMAGED PIPE

(71) Applicant: Marian Gabriel Vlad, Galati (RO)

(72) Inventor: Marian Gabriel Vlad, Galati (RO)

( * ) Notice: Subject to any disclaimer, the term of this patent is extended or adjusted under 35 U.S.C. 154(b) by 440 days.

(21) Appl. No.: 17/309,366

(22) PCT Filed: Nov. 21, 2019

(86) PCT No.: PCT/RO2019/000027
§ 371 (c)(1),
(2) Date: May 21, 2021

(87) PCT Pub. No.: WO2020/214045
PCT Pub. Date: Oct. 22, 2020

(65) Prior Publication Data
US 2021/0317939 A1   Oct. 14, 2021

(30) Foreign Application Priority Data
Nov. 22, 2018   (RO) .............................. a 2018 00930

(51) Int. Cl.
*F16L 55/17*   (2006.01)
*F16L 1/26*    (2006.01)
(52) U.S. Cl.
CPC ................. *F16L 55/17* (2013.01); *F16L 1/26* (2013.01)
(58) Field of Classification Search
CPC ............ F16L 55/17; F16L 57/00; F16L 57/06
(Continued)

(56) References Cited

U.S. PATENT DOCUMENTS 2,585,054 A * 2/1952 Stachura .............. H02G 3/0481
174/DIG. 11
2,756,172 A * 7/1956 Kidd ..................... F16L 59/026
174/DIG. 11
(Continued)

FOREIGN PATENT DOCUMENTS

CH          666108 A5   6/1988
DE         4127242 A1   2/1993
(Continued)

OTHER PUBLICATIONS

International Search Report and Written Opinion; PCT/RO2019/000027; dated Nov. 25, 2020.
Romanian Search Report; RO201800930; dated Nov. 6, 2020.

*Primary Examiner* — Patrick F Brinson
(74) *Attorney, Agent, or Firm* — Dunlap Bennett & Ludwig, PLLC; Anna L. Kinney

(57) ABSTRACT

The invention relates to a flexible piping and an improved process for capturing accidental pressurized fluid leaks resulting from a pipeline wherethrough these fluids are transported, in the situation of breaking or cracking, and redirecting the fluid flow in a controlled manner to a desired direction.

Figure 1:
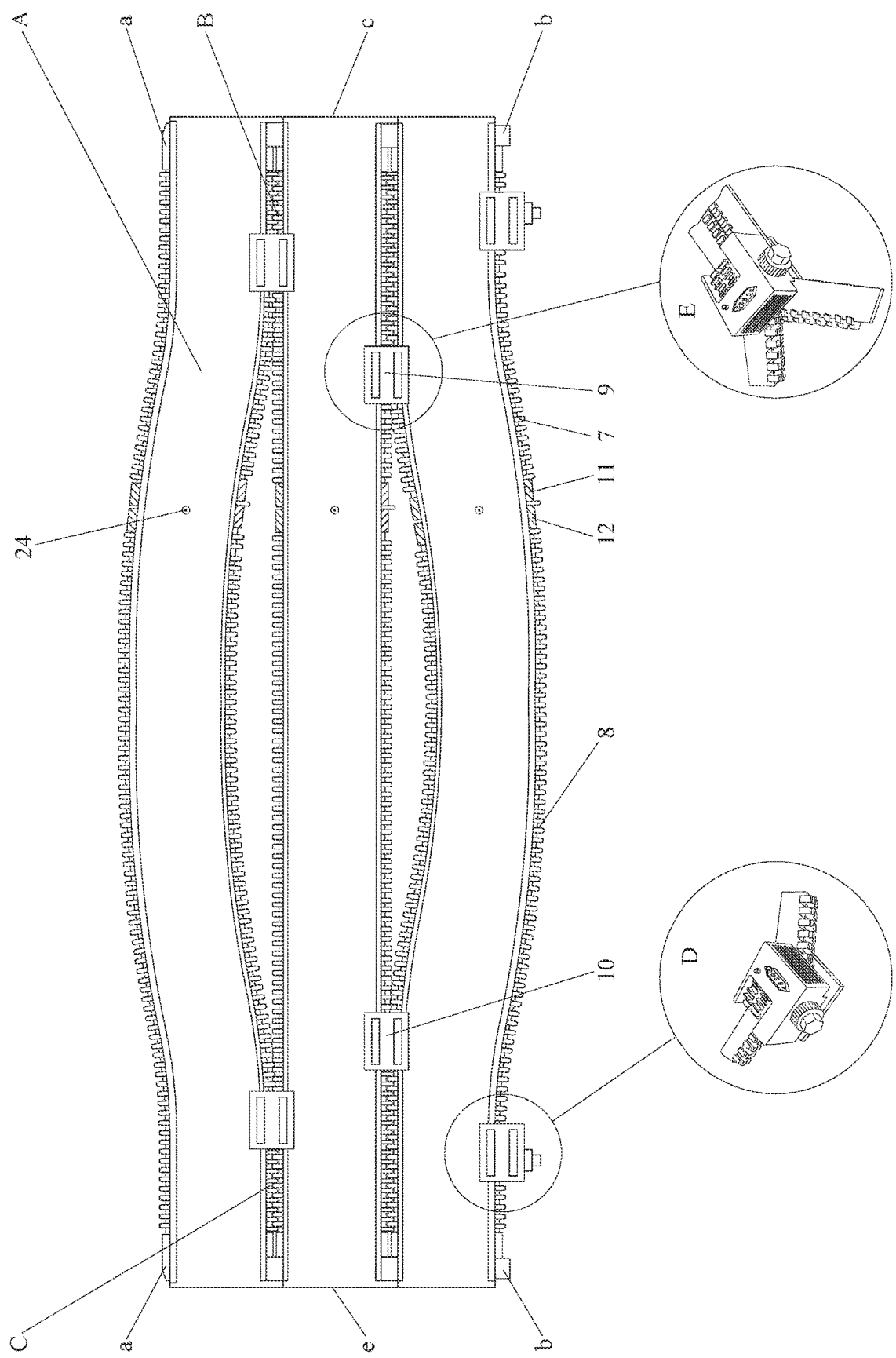

The device according to the invention is made up of a number n≥1 of heat shrinkable strips (A), each provided on both sides with two zippers (B) and (C) having fluid tight toothed rails (7) and (8) with antagonistic directions of operation, in order to allow the interconnecting and closing of the zippers independently from both ends of the piping towards the central part thereof. The strips (A) with antagonistic zippers are each provided, on one of the longitudinal sides with 2 (two) robotic closing sliders (9) and (10) remotely electrically commanded, and at both ends they have provided magnetic inserts (16) and (17) and inserts of (Continued)

shape memory materials (18) and (19) to generate a curvature in the transverse plane of the strips. The strips (A) are provided at the outer side with a layer (14) having properties of thermal protection, and at the inner side with a thermally activable layer (15) of solid adhesive.

The process according to the invention, allows the fixing by heat shrinking and vulcanization of both ends of the flexible piping onto the body of the pipelines on which it is mounted, and comprises in a first step, the mounting on the body of a suction pipe (20), of the front ends (c) of some strips (A) by wrapping around and interconnecting the same, concomitantly acting the curvature in the transverse plane of the element (18) made up of shape memory material, and closing the zippers (B) by moving the robotic closing sliders (9). Subsequently, there are activated the electrical heating resistances (3) for heat shrinking and complete molding of the piping, and the thermal activation of the adhesive layer (15) for the vulcanization on the body of the pipeline (20) on which it was mounted. In a subsequent step, on the damaged end (d) of the pipeline (1) there are mounted the rear ends (e) of the strips (A) by wrapping around and interconnecting the same, concomitantly with acting the curvature in the transverse plane of the elements (19) made up of shape memory material, and closing the zippers (C) by moving the robotic closing sliders (10). Subsequently, there are activated the electrical heating resistances (3) for the heat shrinking and complete moldng of the piping, and the thermal activation of the adhesive layer (15) for the vulcanization on the body of the damaged pipeline (1) on which it was mounted. There is commanded the movement of all robotic sliders (9) and (10) up to the contact thereof with the limit stops (11) and (12), so that all the zippers are completely closed, thereby sealing the system and redirecting the fluid flow coming out through the end of the damaged pipeline (1) towards the suction pipeline (20) and towards the pump (21), which creates a controlled depression in the flexible and tight piping, pushing the captured fluid into the pipeline (22).

7 Claims, 21 Drawing Sheets

(58) Field of Classification Search
USPC ... 138/98, 97, 110, 156, 167, 168, 128, 161, 138/158
See application file for complete search history.

(56) References Cited

U.S. PATENT DOCUMENTS

| | | | | |
|---|---|---|---|---|
| 2,960,561 | A * | 11/1960 | Plummer | A44B 19/16 24/399 |
| 3,233,699 | A * | 2/1966 | Plummer | F01N 13/14 174/DIG. 11 |
| 4,684,762 | A * | 8/1987 | Gladfelter | D03D 15/00 174/DIG. 11 |
| 4,891,256 | A * | 1/1990 | Kite, III | H02G 3/0481 174/DIG. 11 |
| 4,985,942 | A * | 1/1991 | Shaw | E04H 4/144 138/167 |
| 5,391,838 | A * | 2/1995 | Plummer, III | H01B 11/1008 174/DIG. 11 |
| 5,651,161 | A * | 7/1997 | Asta | A47L 9/24 15/325 |
| 5,901,756 | A * | 5/1999 | Goodrich | F16L 3/233 248/205.2 |
| 6,111,194 | A * | 8/2000 | Kroulik | H02G 3/0481 138/128 |
| 6,983,767 | B2 * | 1/2006 | Rickards | F16L 57/00 138/104 |
| 9,267,634 | B2 * | 2/2016 | Baker | F16L 55/17 |
| 10,656,044 | B1 * | 5/2020 | Kuo | G01M 3/165 |
| 11,662,118 | B2 * | 5/2023 | Lu | F16L 59/22 138/128 |
| 2018/0070786 | A1 * | 3/2018 | Asta | A44B 19/24 |

FOREIGN PATENT DOCUMENTS

| | | |
|---|---|---|
| EP | 0106446 A1 | 4/1984 |
| EP | 3097337 B1 | 11/2018 |
| JP | 2001056086 A | 2/2001 |
| RO | 127040 B1 | 5/2013 |
| RO | 130429 A2 | 7/2015 |
| WO | 2015171009 A1 | 11/2015 |

* cited by examiner

FLEXIBLE PIPING AND PROCESS FOR CAPTURING ACCIDENTAL PRESSURIZED FLUID LEAKS FROM A DAMAGED PIPE

The invention relates to a flexible piping and to a process for capturing accidental pressurized fluid leaks resulting from a pipeline transporting such fluids, in case of breaking or cracking the same for various reasons, and the controlled redirecting of the fluid flow in a desired direction, for example towards a storage system in case of broken pipelines, and in case of cracking there taking place a local repair of the pipeline so as to ensure the continuity of fluid transport through the pipeline having the device claimed by the invention positioned therein.

There are known flexible piping for capturing accidental pressurized fluid leaks from pipelines transporting such fluids, in case of breaking or cracking the same for various reasons, which comprise a number $n \geq 1$ of longitudinal strips made of composite materials which are provided with some fasteners with zipper operated by pulling by means of a flexible element, such as a cable or chain, by coupling the teeth, the zippers becoming fluid-tight, the strips being provided with at least one heat shrinkable area with shrinkage in the transverse plane, wherein the temperature is obtained from some electrical heating resistances connected to a power source with electric circuit by means of some terminals—EP 3097337 B1.

The disadvantage of these flexible piping consists in that:
- there not being provided antagonistic and independent interconnecting and closing systems mounted at both ends, it is not possible to mount and secure both piping ends by heat shrinking;
- before intervening on the broken pipeline, the free ends of the system of strips have to be mounted on the storage system or on the pump, by means of a clamp and a connecting element or an adapter coupling with invariable fastening characteristics, in compliance with the characteristics of the flanges connecting to the pump or to the recovered fluid storage system, and a diameter comparable to the maximum diameter of the flexible piping that will be generated by closing the strips;
- closing the zippers by pulling the cables or chains is not reversible, and by pulling there are generated strains that may cause further damages by bending or breaking the pipeline on which these are mounted, the detaching from the pipeline, breaking the electrical heating resistances from inside the strips causing discontinuous power supply of the resistances.

There are known processes for capturing accidental pressurized fluid leaks from pipelines transporting the same, in case of the pipeline breaking or cracking for various reasons, the capturing process carried out by means of the flexible piping comprising assembling together by interconnection and wrapping an end of the heat shrinkable strips provided with fasteners with zippers that are closed gradually by pulling, and by subsequent heat shrinking the flexible piping these are molded on the body of the broken pipeline on which it was mounted, under the conditions in which the other end of the strips is already mounted and secured by clamps on a standardized connecting element/on an adapter coupling compatible with a network of transport pipelines or with a pipeline for supplying a pump which creates a depressurization, and by closing the zippers there is finally formed a flexible piping from heat shrinkable strips interconnected by means of the zippers—EP 3097337 B1.

The disadvantages of these processes consist in that they:
- require additional time for carrying out the measurements, designing and achieving the adapters coupling with the pump intake or with the storage system;
- require additional time for the operation of mounting the free ends of the strips, by means of clamps, on an adapter coupling compatible with the element connecting with the pump suction or with the storage system (tank);
- require the intervention of a floating crane for remote handling of some additional weights and for offering ROV assistance (vehicle with capability of carrying out remotely controlled complex working operations) within the operation for mounting the adapter coupling on the element coupling the pump (pump suction) or the storage system;
- require the simultaneous presence of many ROVs for carrying out remotely controlled complex working operations, that have to take place for sustaining and correspondingly positioning the strips within the operation for sliding the fasteners for closing the zippers, which is carried out by the synchronized pulling of some chains or cables, as the sliding by pulling requires a specific positioning of the toothed zipper rails in relation to the pulling angle of the closing sliders;
- in case of damage by breaking a submarine pipeline in the offshore exploitation perimeters in the Arctic regions, where the sea is frozen over several months, or in hurricane season, it is practically impossible to mobilize and correlate a relatively large number of specialized vessels and crews to manage a relatively large number of vehicles with the capacity of carrying out remotely controlled complex working operations, until the favorable work conditions return;
- since the zippers are being closed from a single direction, from one of the strip ends, only one piping end may be fixed in a first stage by heat shrinking, while the opposite end will have to be secured by clamps and will be heat-shrunk only after finishing the operation of completely pulling the fasteners for closing the zippers, which will generate the tearing out of the clamps in the final stage of closing the zippers, as a consequence of concentrating a powerful flow of fluids released from said region, thereby rendering the operation more difficult;
- pulling the fasteners by chains or cables is not reversible and may cause damages by breaking the electrical heating resistances inside the strips while closing the zippers, or may cause damaging to the pipeline on which the intervention takes place, or may cause the tearing out of the strips from the damaged pipeline on which they were fixed;
- in case of an intervention to a cracked pipeline, the end of the flexible piping to be wrapped around and fixed with clamps to the body of the cracked pipeline will show diameter differences that are incompatible with the diameter of the cracked pipeline, reason for which the tight fixing is hard to achieve in the absence of the possibilities of adjusting and adapting the diameter of both ends by heat shrinking.

The technical problem to be solved by the device and process according to the group of inventions consists in:

Lowering the intervention time and simplifying the coupling of a strip end to the pump suction pipe, namely of the other strip end to the broken pipeline, or fixing both ends on a cracked pipeline as well a strict control of the moments when heat shrinking is to be applied in relation to the stage of interconnecting the strips by closing the zippers, and increasing the fixing efficiency with a relatively long period of time, respectively.

The device claimed by the invention removes the disadvantages shown in that:

Each of the strips is provided, to both sides, with two zippers having antagonistic operating directions which allows interconnecting and independently closing the zippers from both ends of the piping towards the central side thereof.

The strips with antagonistic zippers are each provided on one of the longitudinal sides with two remotely electrically controlled robotic closing sliders.

The strips are provided at both ends with inserts of shape memory material and magnetic zones in order to facilitate wrapping and fixing onto the pipelines.

The strips with antagonistic zippers are provided along the antagonistic zippers with circuits monitoring the zipper closing stage The strips are provided to the outer side with a layer having thermal protection properties and to the inner side with a thermally activable solid adhesive layer.

The process claimed by the invention eliminates the disadvantages shown in that:

According to the invention, the intervention time is reduced, since by heat shrinking at both ends, the process may be applied in a wide range of situations, without requiring precise design measurements or a time necessary for carrying out adapter coupling with invariable fastening features, compatible to the shapes and diameters that the damaged pipelines or the coupling elements on the suction or transport pipes may present;

By using a piping with heat shrinking at both ends, the process simplifies the intervention, since there is no longer need for a floating crane to contribute to the operation for the purpose of handling a piping burdened with a massive adapter coupling.

The operation of wrapping around the strips on the pipeline body is facilitated by the magnetic systems and by the systems with flexing in the cross-sectional plane, generating a curvature commanded by means of the remotely controlled shape memory elements incorporated.

The process of vulcanization at both ends of the piping onto the pipeline body increases the safety degree of securing and sealing by means of the heat-activable solid adhesive layer provided to the inner side of the strips.

The process of closing the zippers with robotic closing sliders simplifies the intervention and due to the smooth movement, the zippers may be closed and opened based on the commands of an operator, without strains being generated in the strips, thereby avoiding the danger of breaking the heating resistances circuits inside the strips or their tearing out from the pipeline they were mounted on, or other damages during the process of closing the zippers.

The process may be applied in short time even in the regions with unfavorable climate, without requiring a fleet of intervention ships to manage several ROVs (Remotely operated vehicles, equipment that are known per se), for simultaneously taking part in wrapping the strips and in the operation of pulling the closing sliders by means of chains or cables.

In case of intervention to pipelines with continuous body, damaged by cracking, the process claimed by the invention allows the complete fixing by heat shrinking and vulcanization at both ends, simplifying the intervention, since there is no longer need for temporary unsealed fixing, with clamps at one end.

In case of intervention to pipelines with continuous body damaged by cracking, the process claimed by the invention enables the discharge of the fluid in excess from the inner side of the strips sealed by their being tightly joined, through a peristaltic movement generated in a controlled manner from both ends towards the purge valves provided on each strip.

The device and process claimed by the invention show the following advantages:

In the embodiment where the claimed device is employed in the aquatic environment, only one ROV is used, not requiring several ROVs or floating cranes to manipulate adapter coupling in the water.

Positioning and fixing, in relatively short time, both ends of the strips directly on the pump suction pipe and on the end of the broken pipeline, namely on one side and the other of the crack regardless of the shape and position of the broken end of a pipeline and regardless of the features of the coupling element of the storage system or to the pump suction pipe.

There is facilitated the mounting by wrapping around the pipelines, due to the inserts at both ends of the strips, where there are provided magnetic zones and zones for flexing in the cross-sectional plane, generating a curvature for rendering easier the folding and wrapping around the pipelines.

Providing a durable and tight fixing over time, by heat shrinking and vulcanization of both ends of the strips, either in the version in which the pipeline is broken, or in the version where the pipeline is cracked.

Eliminating the introduction of additional strains acting on the strips by eliminating the pulled closing of zippers and introducing a robotic system moving smoothly along the toothed zipper rails.

A strict control of the zipper closing degree is enabled by precisely monitoring the position of each slider, as well as by maneuvering in both directions, simultaneously or not, the closing system with two antagonistic zippers on each of the strip sides.

It is possible to discharge the fluid in excess from inside the strips joined between them both through a peristaltic movement generated in a controlled manner and by the purge valves provided on each strip.

Figure 2:
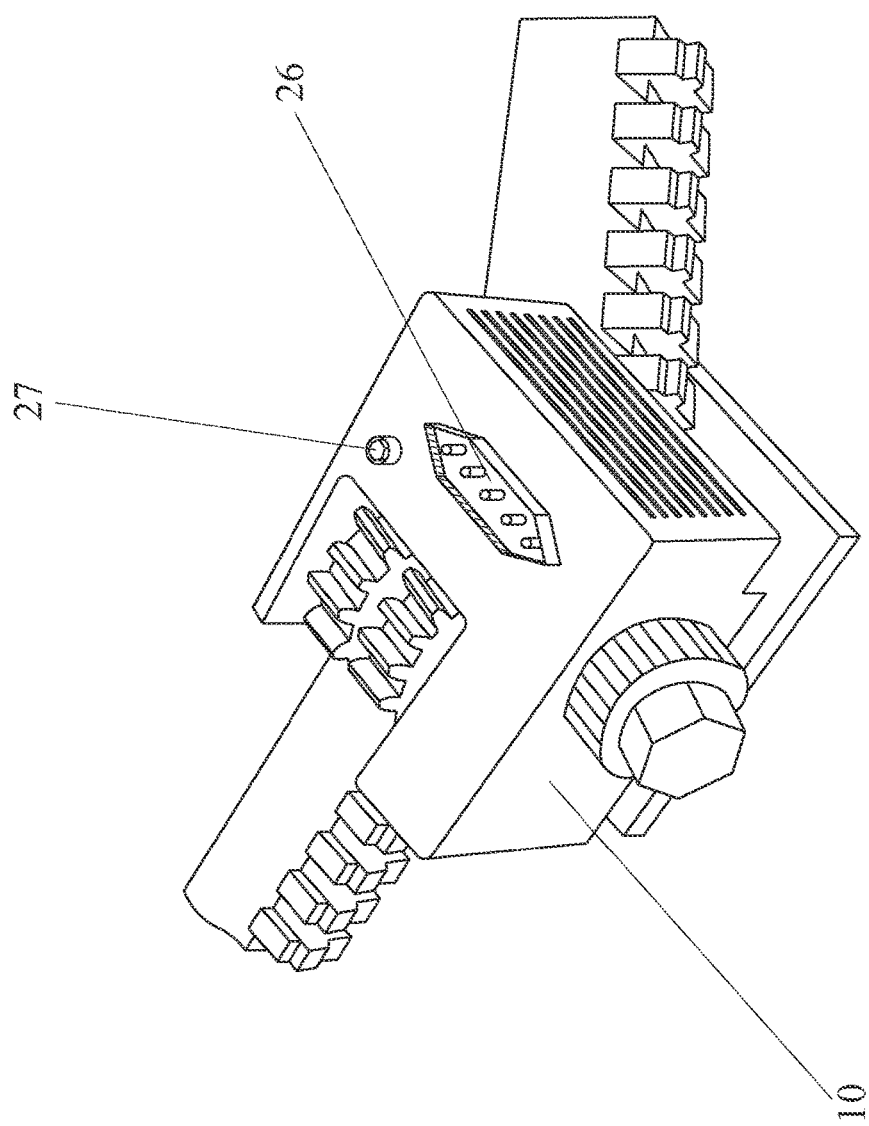
Figure 3:
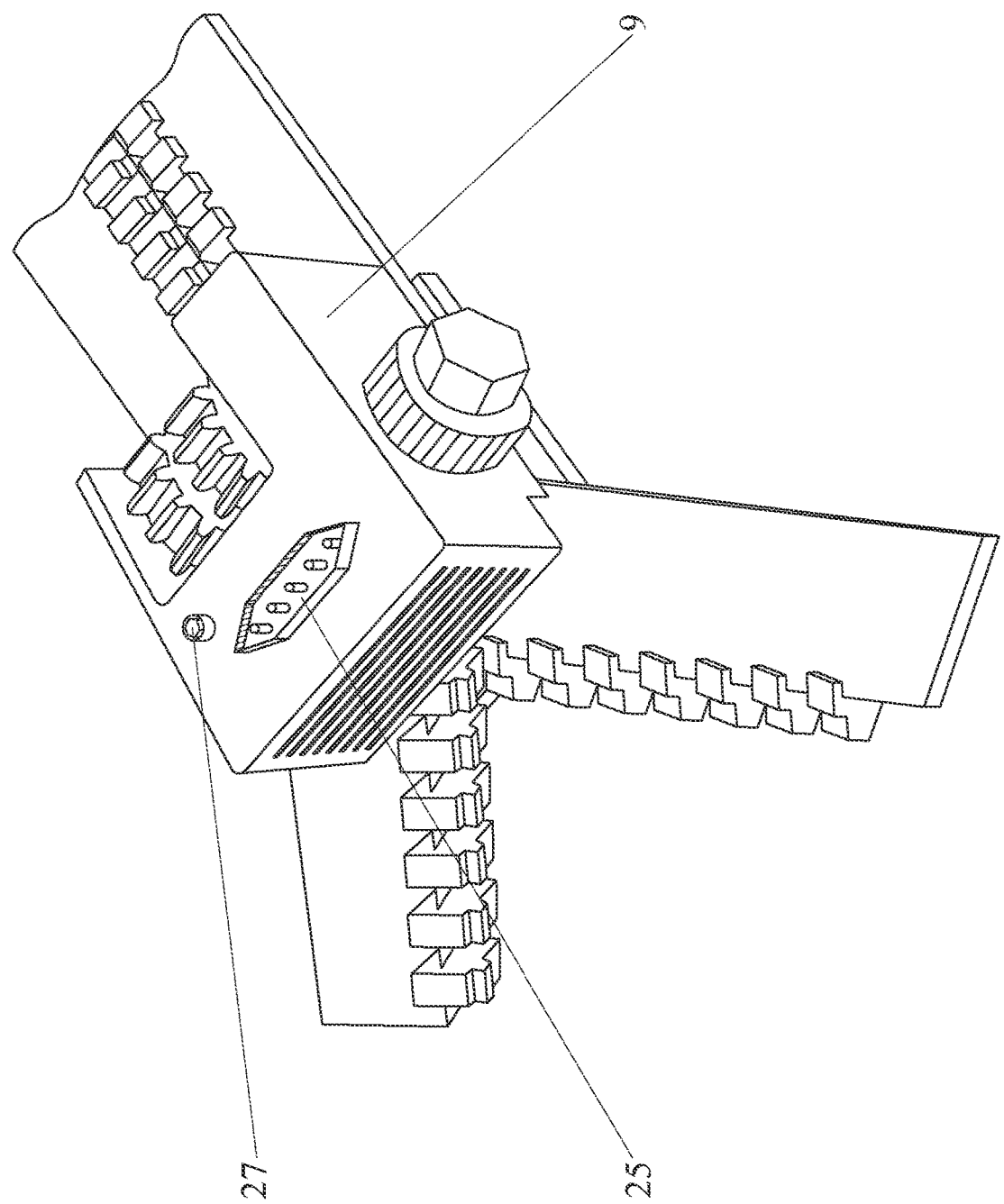
Figure 4:
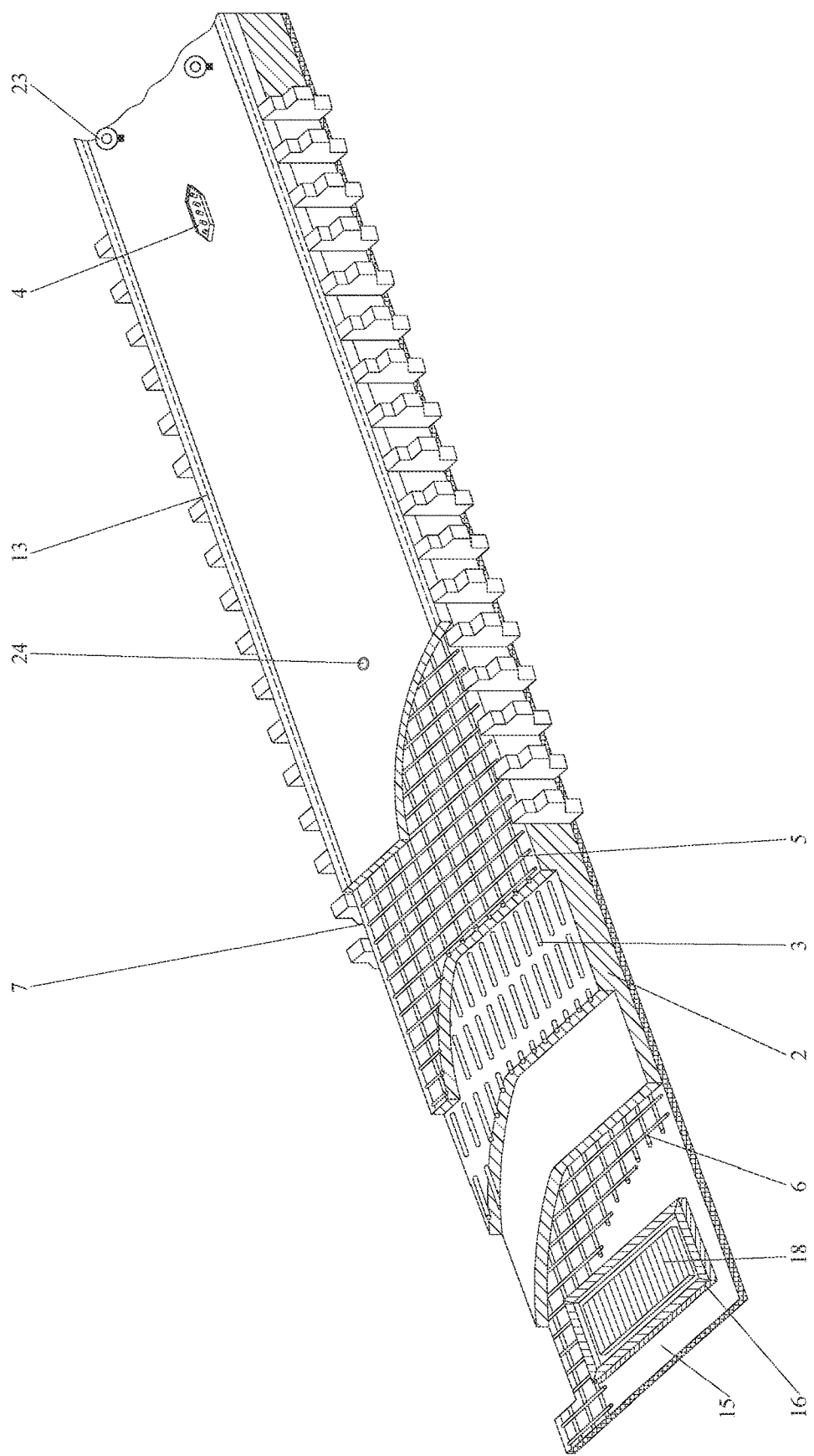
Figure 5:
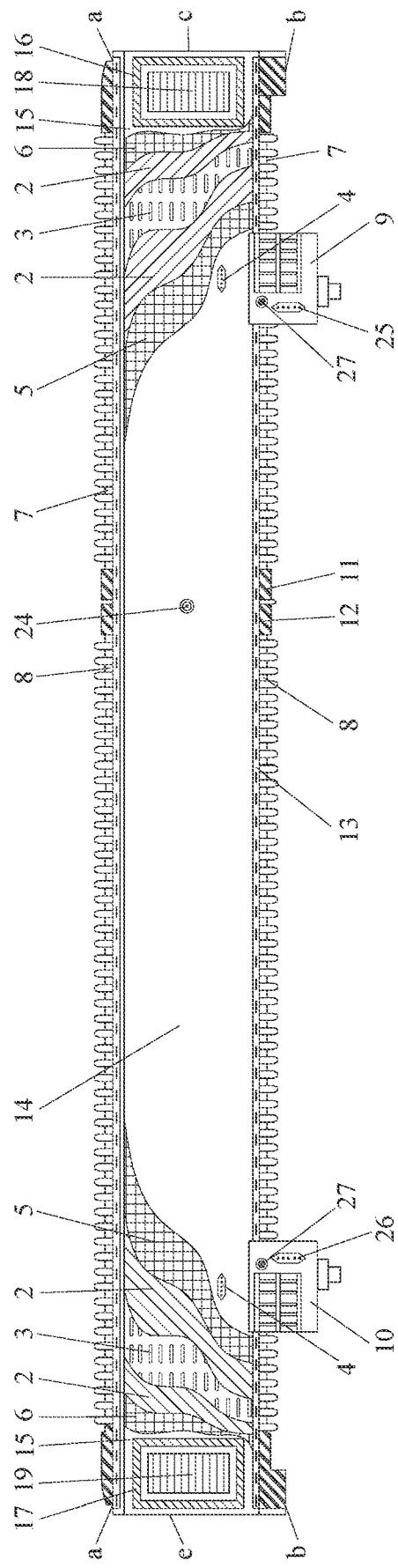
Figure 6:
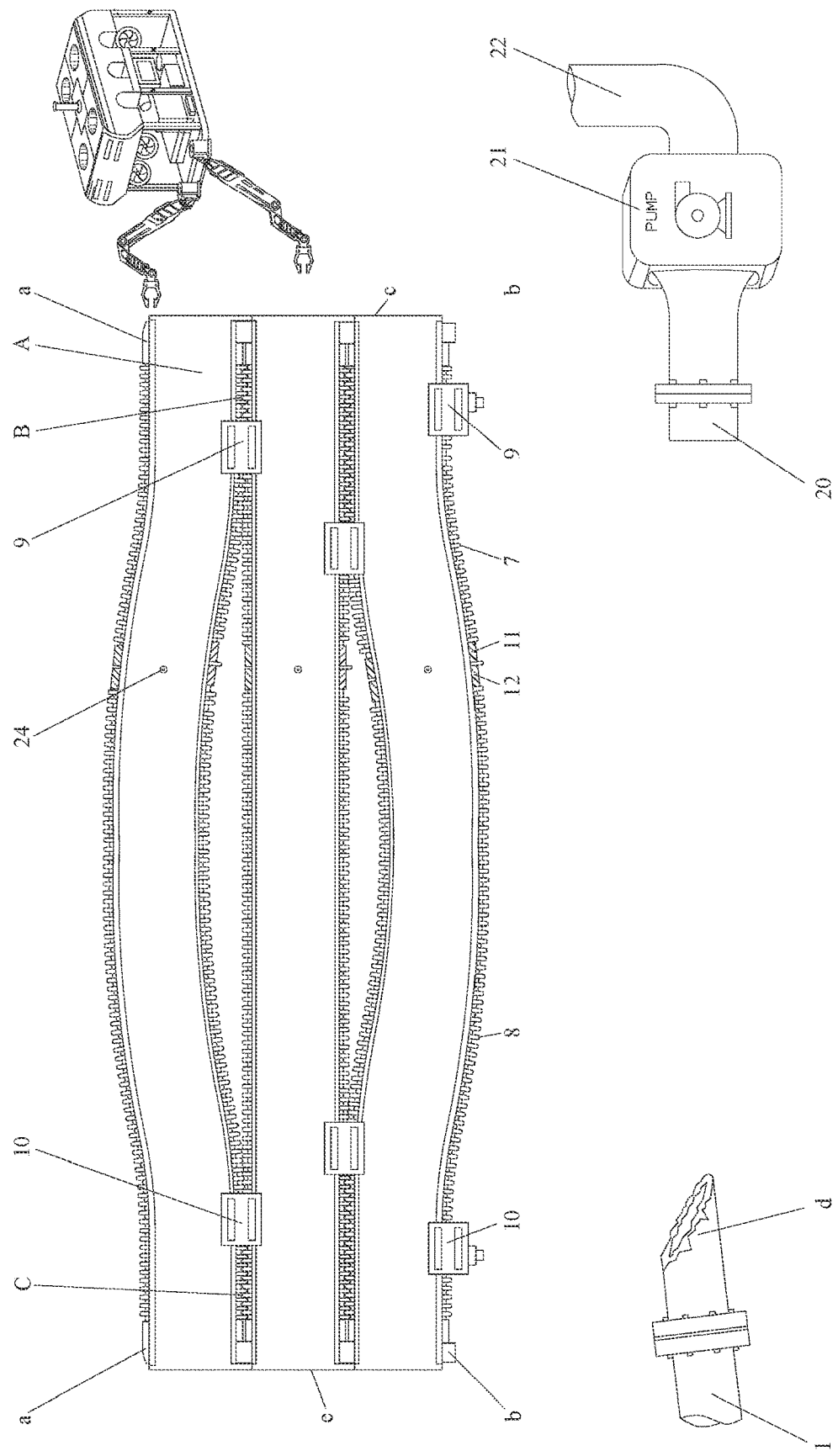
Figure 7:
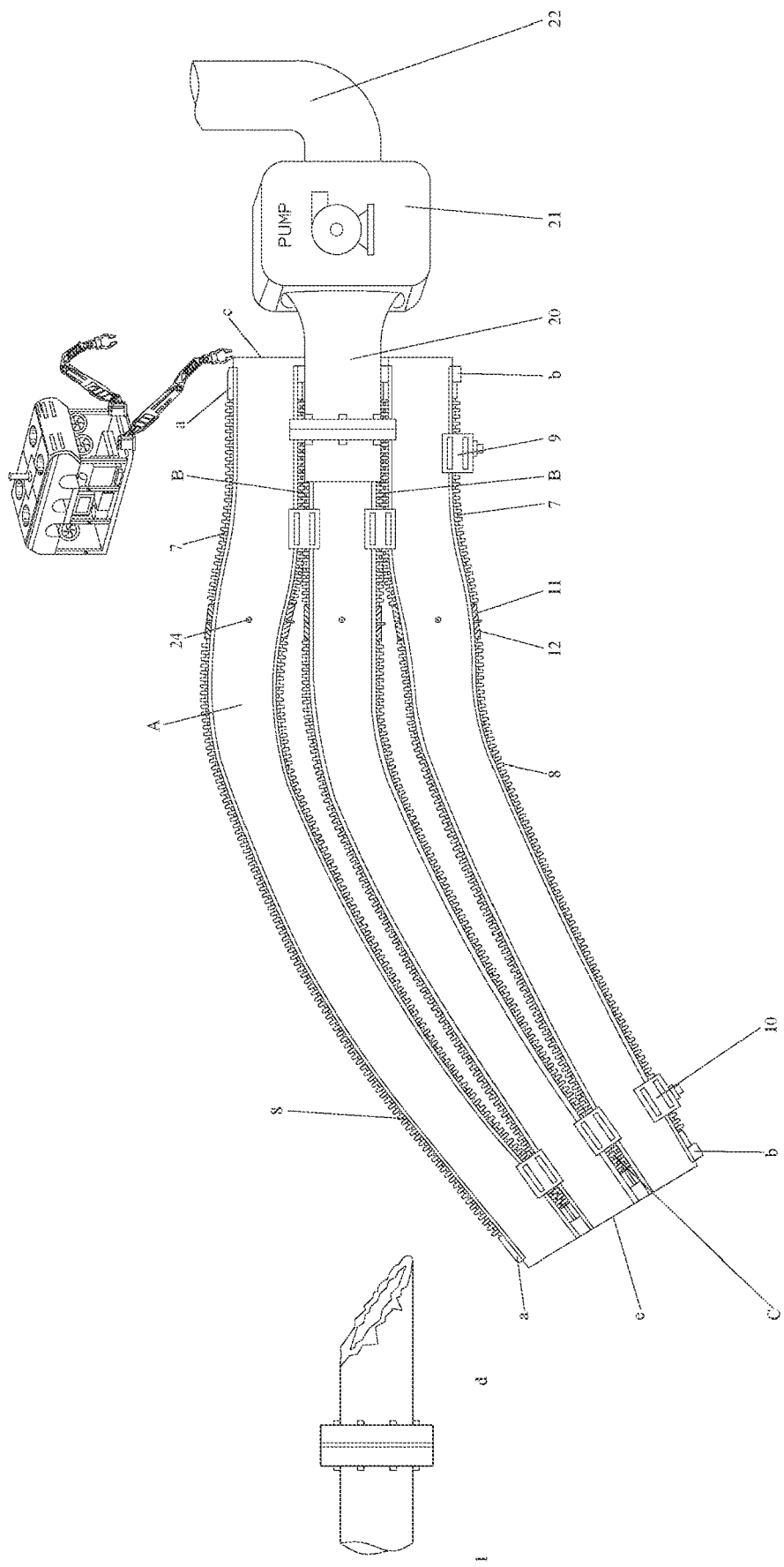
Figure 8:
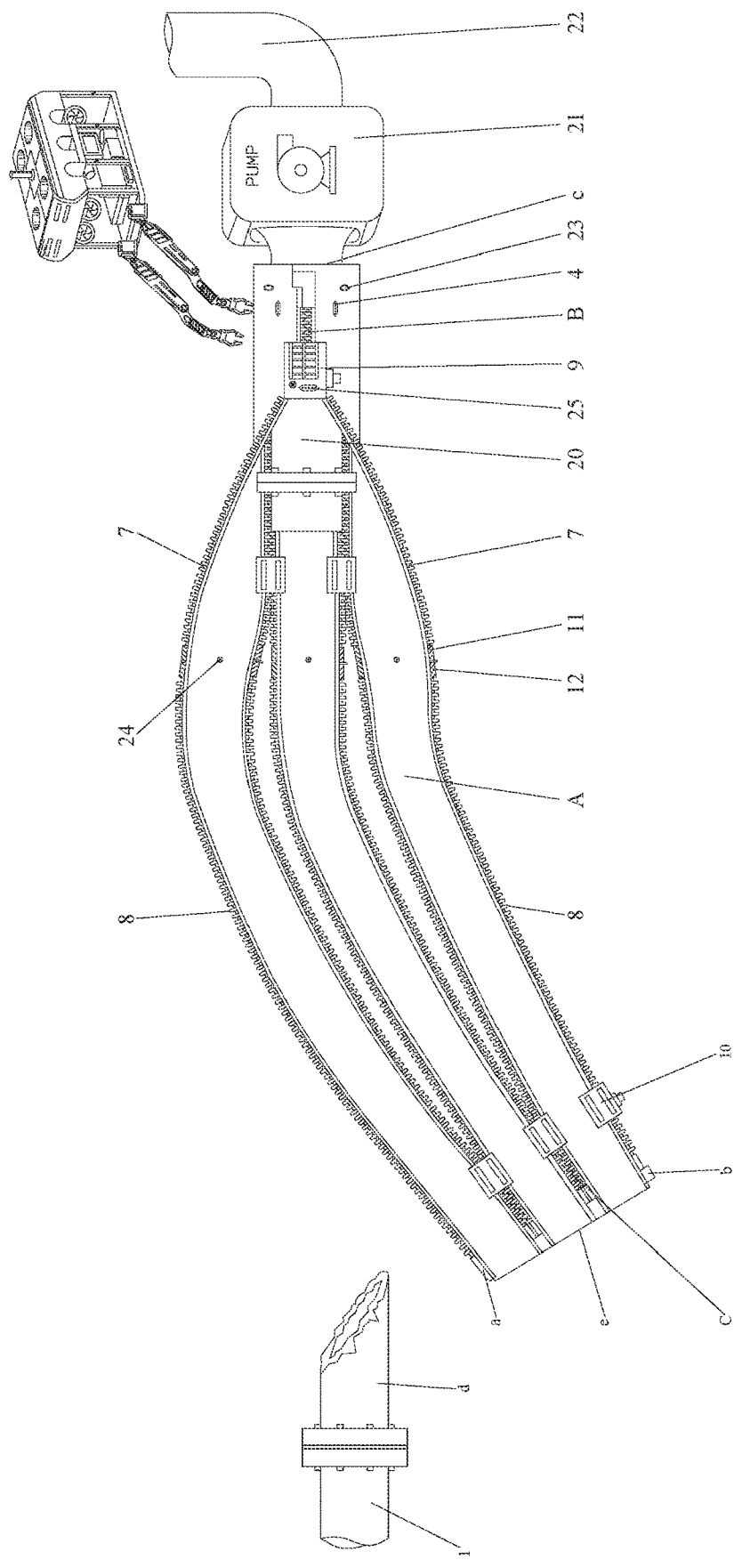
Figure 9:
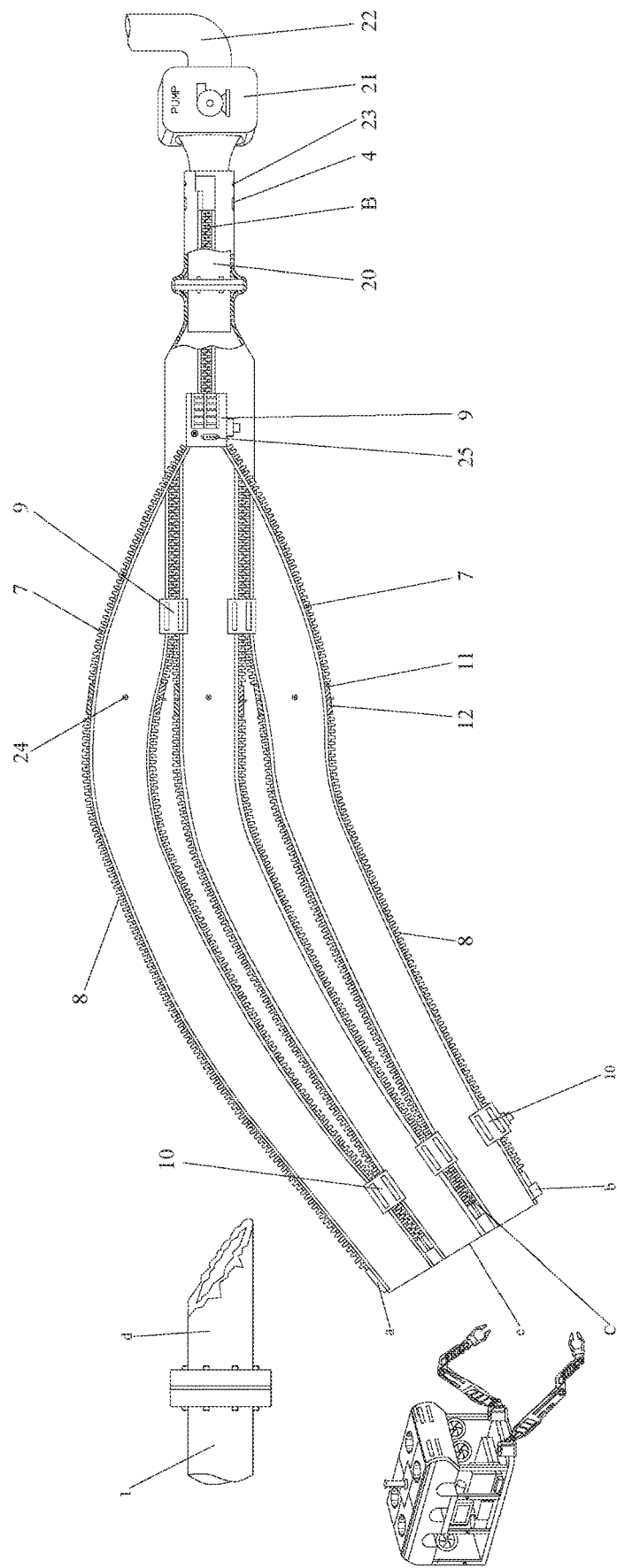
Figure 10:
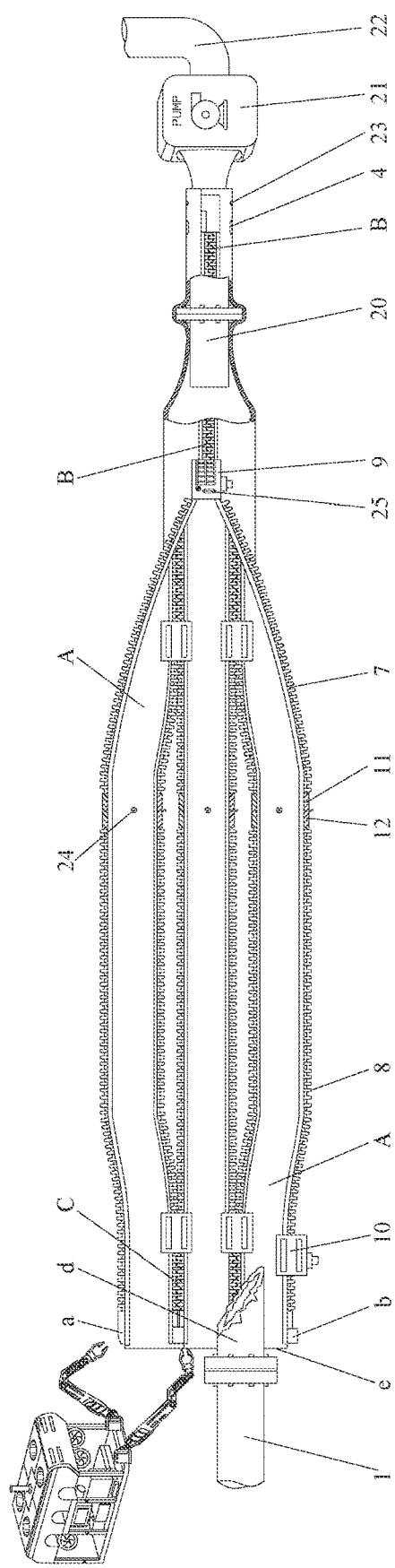

There is given hereinafter an embodiment of the flexible piping and of the process according to the inventions, in connection with FIGS. 1, 2, 3, 4, 5, 6, 7, 8, 9, 10, 11, 12, 13, 14, 15, 16, 17, 18, 19, 20 and 21, which represent:

FIG. 1 a top view of some flexible strips of the piping, joined between them, partially at both ends by means of some zippers;

FIG. 2 constructive detail D shown in FIG. 1, representing a robotic closing slider in the situation when the zipper is open, the slider being provided with electric motor and some built-in gears for electrically controlled movement in both directions, the connecting terminal for multiple functions, backup system for mechanically operating the mechanical movement of the closing slider gears by rotating a standardized coupling element connected to the incorporated gear;

FIG. 3 constructive detail E shown in FIG. 1, representing a robotic closing slider similar to the slider of FIG. 2, in the situation in which the zipper is closed, thereby joining two toothed zipper rails;

FIG. 4 perspective view, with the fracture, of a flexible strip provided with some heat shrinkable zones having incorporated independent, sectored networks of electrical heating resistances, provided laterally with some toothed rails of a fluid-tight zipper, equipped with robotic closing sliders and with system monitoring the closing slider position along the toothed rails of fluid-tight zipper, and at the ends there being provided with zones with inserts of shape memory materials and with magnetic material inserts, the strip having to the upper side a layer of material with thermal protection properties, to the lower side a heat-activable solid adhesive layer, and to the ends being provided with handling eyelets and connection terminals for multiple functions;

FIG. 5 a top view of a flexible strip provided with some heat shrinkable zones having incorporated independent, sectored networks of electrical heating resistances and reinforcing networks made of aramide fibers, at both ends there being provided with zones with inserts of shape memory materials and with magnetic material inserts, the strip being provided laterally with some toothed rails of fluid-tight zipper, one of the rails being equipped with two robotic closing sliders with antagonistic operation directions;

FIG. 6 top view of some flexible strips of the piping, joined together partially, prior to their being applied first to the body of the pump's suction pipe, and the other end of the strips being prepared to be subsequently applied to the body of a damaged pipeline wherefrom pressurized fluids are accidentally discharged;

FIG. 7 top view of some flexible strips of the piping, joined together partially, wherein an end of the strips is handled to be applied by wrapping around the pump's suction pipe body by means of one ROV, and the other end of the strips being prepared to be subsequently applied around the damaged pipeline body wherefrom pressurized fluids transported are accidentally discharged;

FIG. 8 top view of the flexible piping shown in FIG. 7, wherein, by wrapping around and partially closing the zippers, there is formed a piping end around the body of a pump suction pipe, waiting for the remote command for the tight fixing by heat shrinking and vulcanization, and the other end of the strips being prepared to be subsequently applied around the body of the damaged pipeline wherefrom the pressurized fluids transported are accidentally discharged;

FIG. 9 top view of the flexible piping, wherein the end of the formed piping is already fixed tightly to the body of the suction pipe by remotely electrically commanded heat shrinking and vulcanization, and the other end of the piping being prepared to be applied by means of one ROV to the body of the damaged pipeline, wherefrom the pressurized fluids transported are accidentally discharged;

FIG. 10 top view of the flexible piping, wherein an end of the strips is handled by means of one ROV in order to be wrapped around the body of the damaged pipeline, wherefrom the pressurized fluids transported are accidentally discharged, while the opposite end of the piping is already fixed tightly by remotely electrically commanded heat shrinking and vulcanization to the body of a pump suction pipe.

Figure 11:
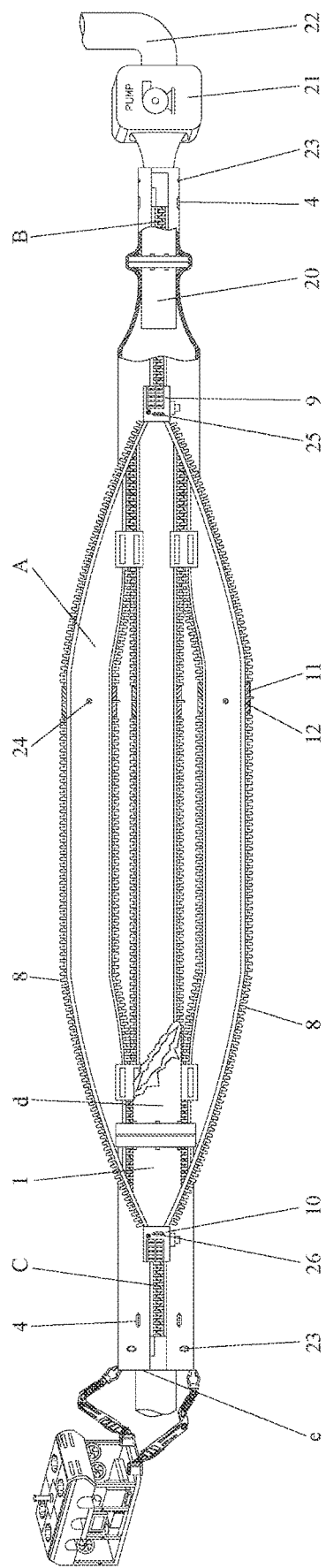
Figure 12:
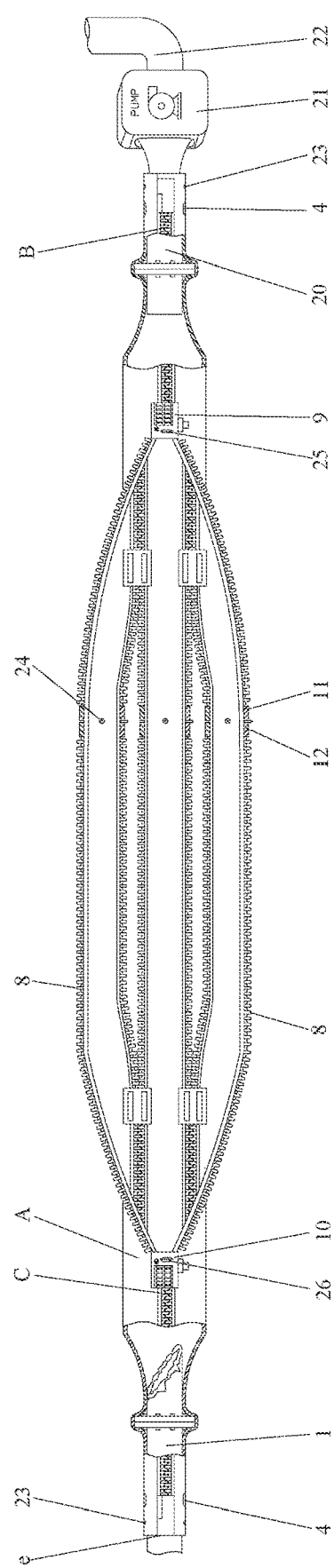
Figure 13:
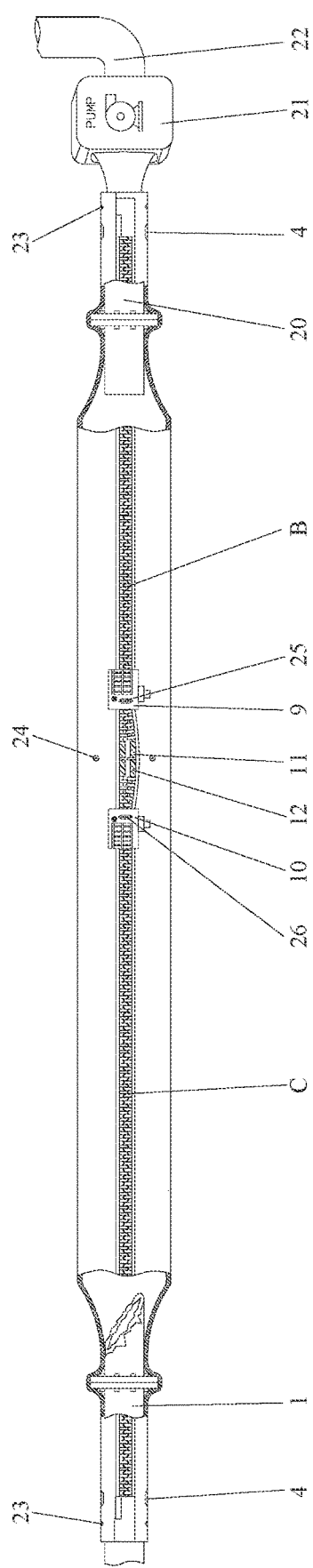
Figure 14:
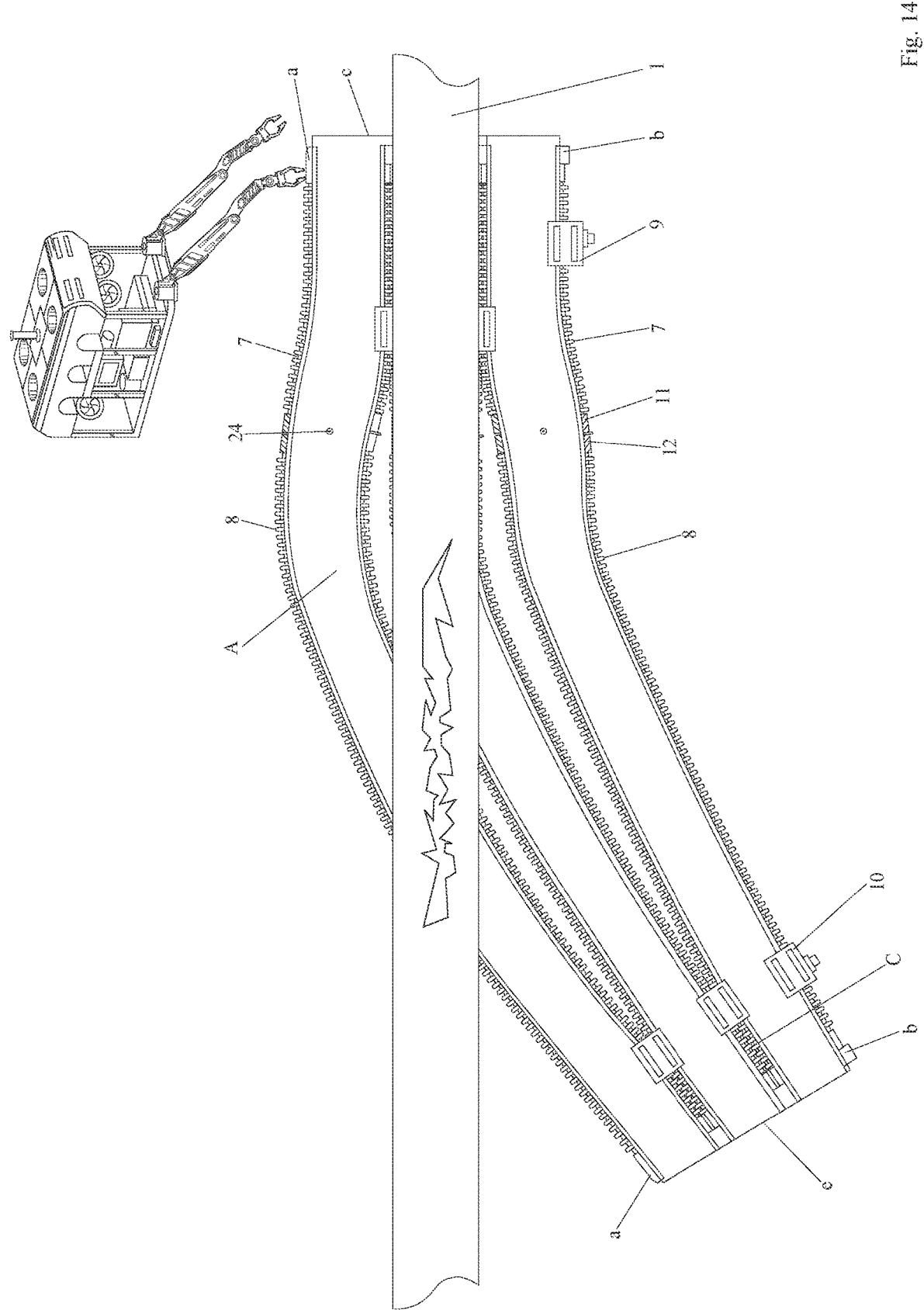
Figure 15:
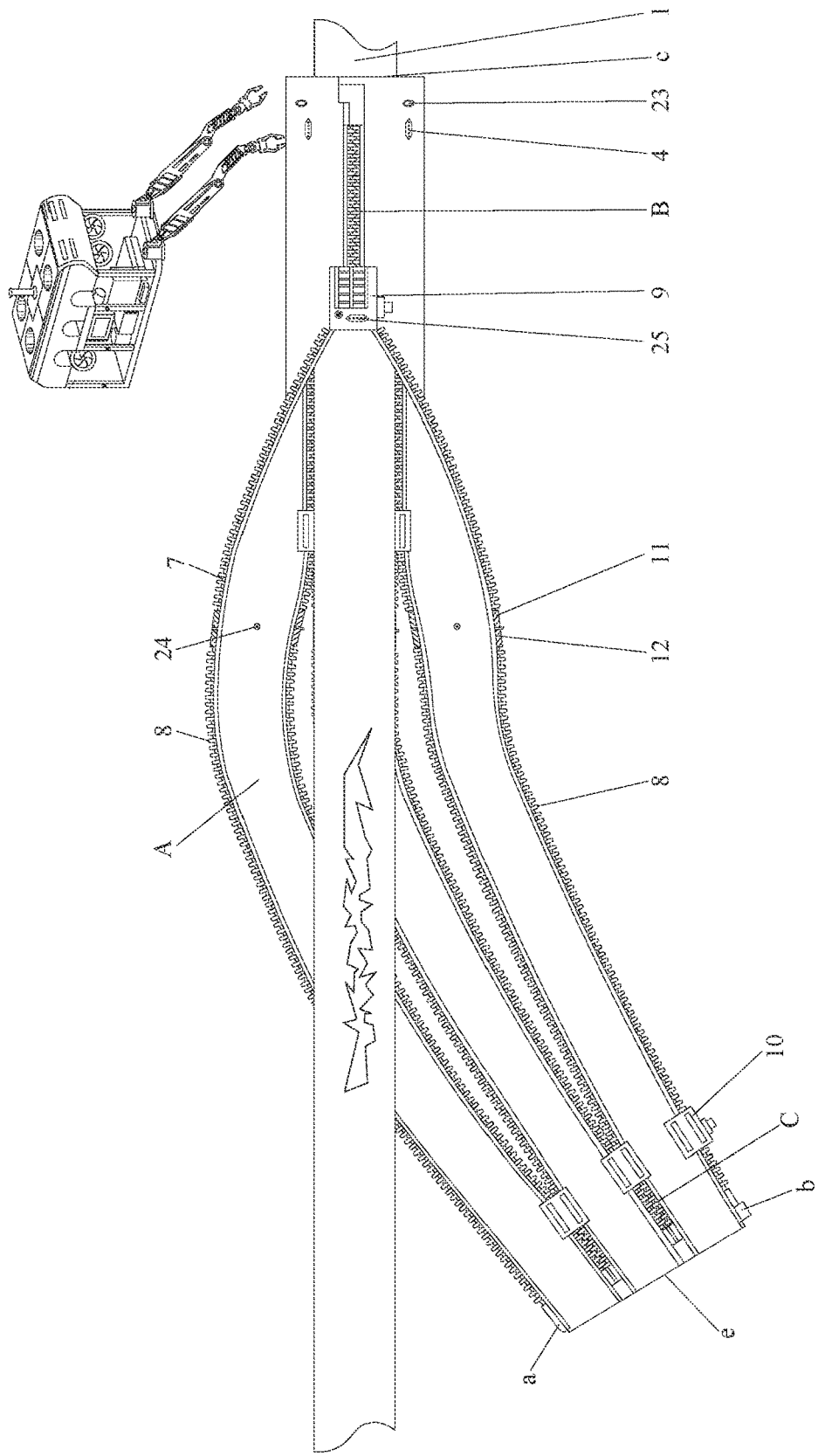
Figure 16:
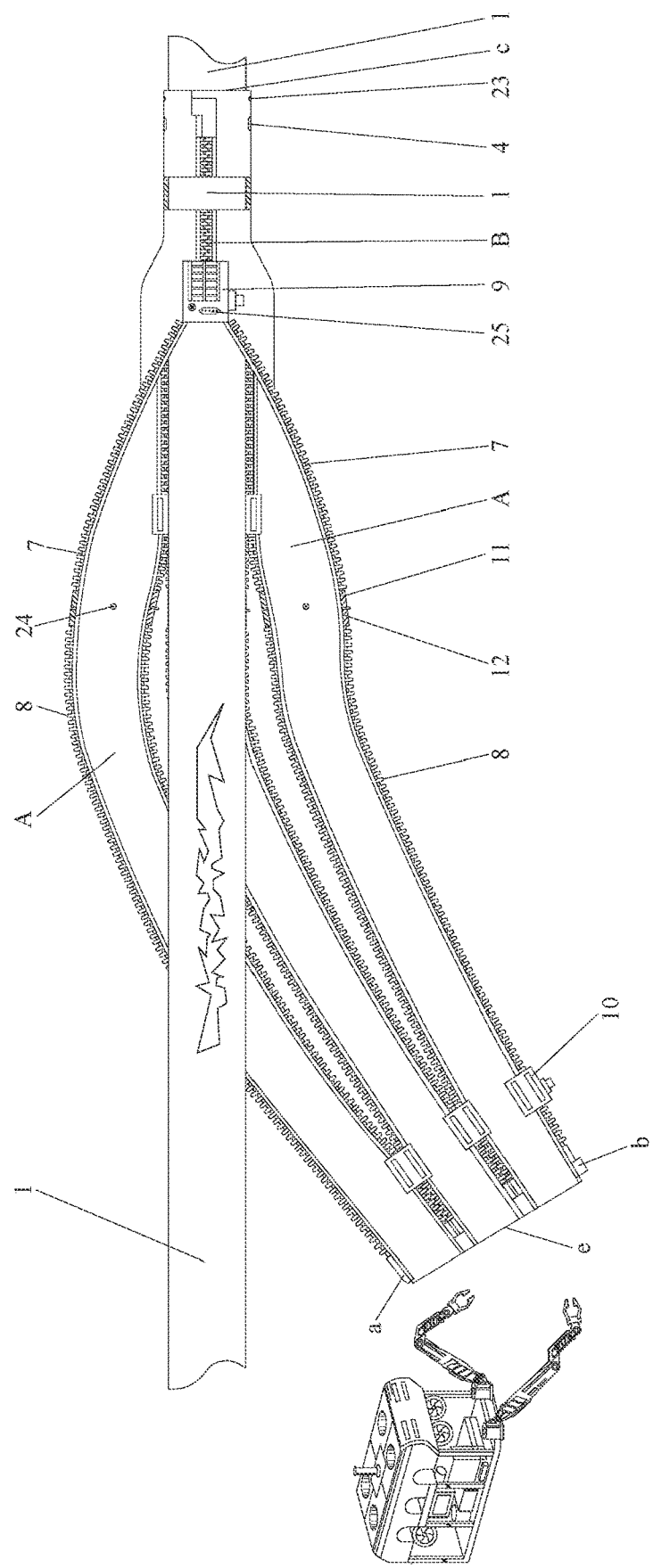
Figure 17:
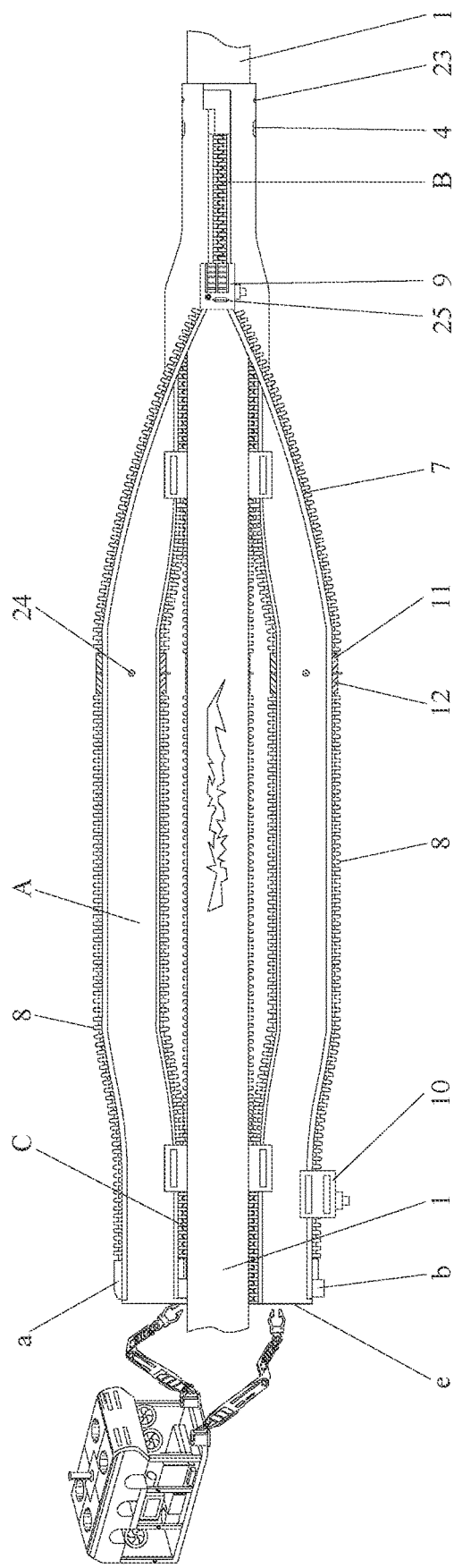
Figure 18:
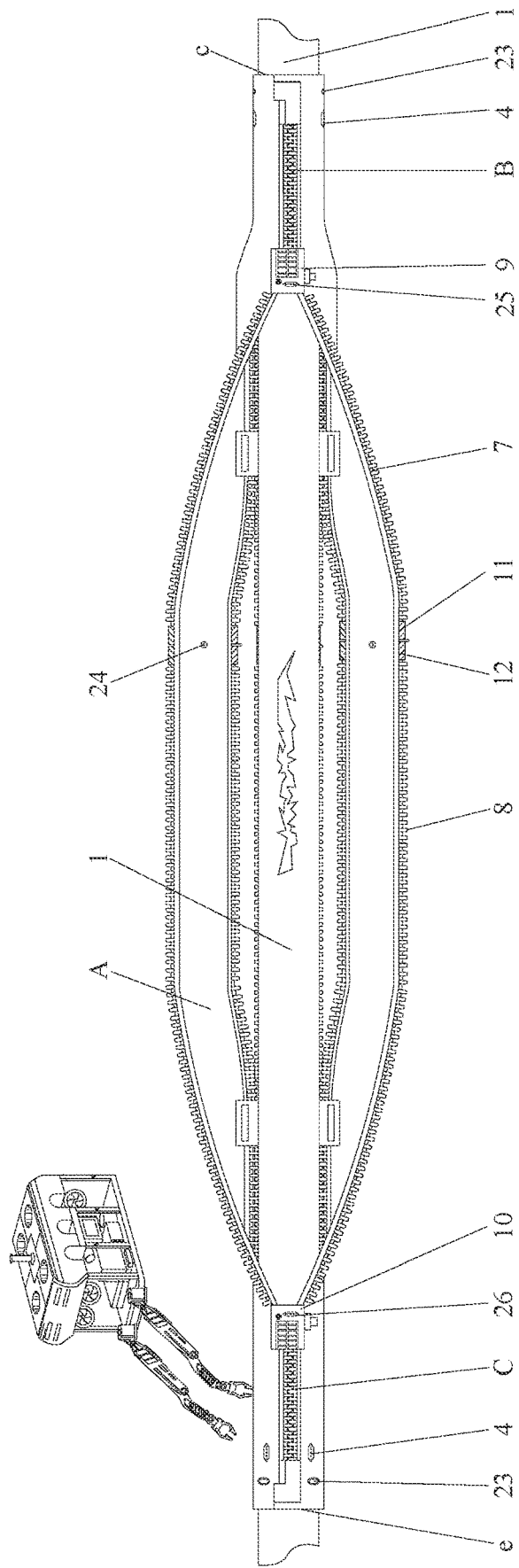
Figure 19:
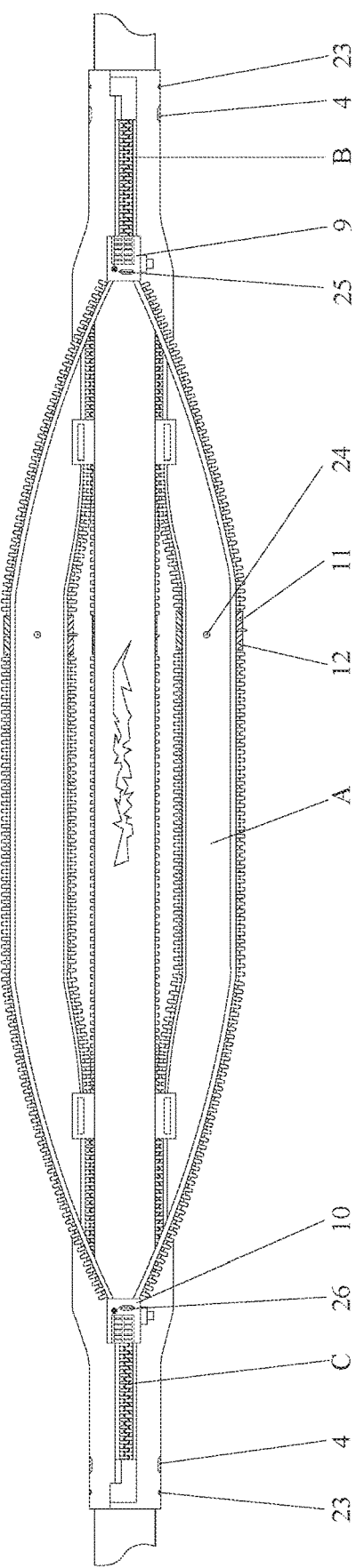
Figure 20:
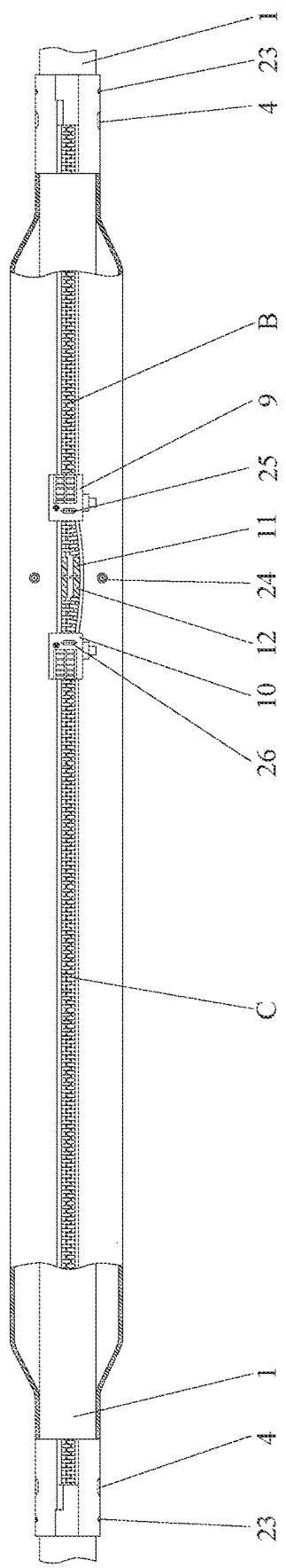
Figure 21:
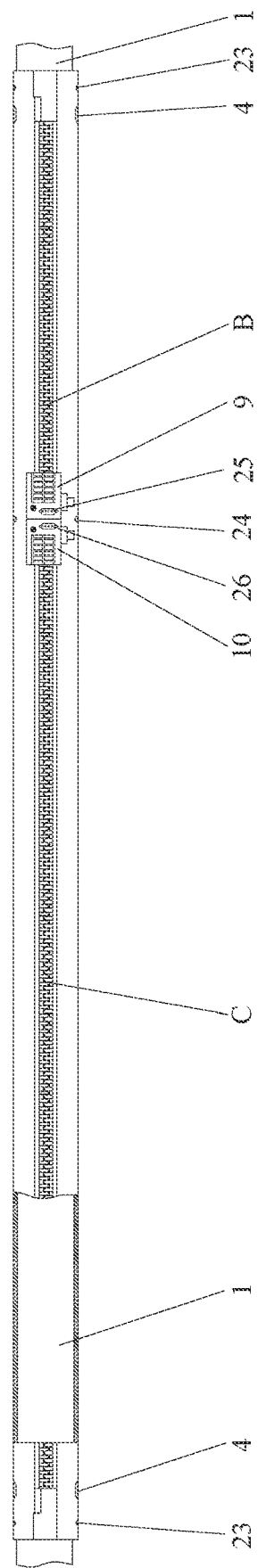

FIG. 11 top view of the flexible piping, wherein, after wrapping the second end of the strips by means of one ROV, by partially closing the zippers, there is formed a piping end around the body of the damaged pipeline, waiting for the remote command for tightly fixing by heat shrinking and vulcanization;

FIG. 12 top view of the flexible piping, wherein both ends of the formed piping are already tightly fixed by remotely electrically commanded heat shrinking and vulcanization, one of the ends on the damaged pipeline body and the other end on the body of a pump suction pipe;

FIG. 13 top view of the flexible piping, wherein, by approaching and sealing all the strips by completely closing the antagonistic zippers by means of the robotic closing sliders, there is sealed the flexible piping wherethrough the captured fluid is transported, there being also possible to create a controlled depressurization by means of the pump;

FIG. 14 top view of a pipeline transporting fluids, said pipeline being cracked, and of some flexible strips of a piping, joined between them, partially, wherein an end of the strips is handled to be wrapped around the body of the cracked pipeline, by means of one ROV, the strip ends being located on one side and the other of the cracked zone, wherethrough pressurized fluids transported are accidentally discharged;

FIG. 15 top view of the flexible piping shown in FIG. 14, having one of the ends wrapped around the body of the cracked pipeline, at a distance conveniently chosen in relation to the cracked zone, waiting for the remote command, for tightly fixing by heat shrinking and vulcanization, and the other end of the strips being prepared to be subsequently applied around the body of the cracked pipeline;

FIG. 16 top view of the flexible piping, wherein the first end of the piping already formed is already fixed tightly on the body of the cracked pipeline, by remotely electrically controlled heat shrinking and vulcanization, the other end of the piping being prepared to be applied around the body of the cracked pipeline;

FIG. 17 top view of the flexible piping, wherein the second end of the flexible strips of the piping, joined between them, partially, is handled to be wrapped around the body of the cracked pipeline by means of a ROV, while the opposite end of the piping is already fixed tightly by remotely electrically commanded heat shrinking and vulcanization, on the body of the cracked pipeline;

FIG. 18 top view of the flexible piping, wherein, after wrapping the second end of the strips by means of one ROV onto the body of the cracked pipeline, by partial closing the zippers there is formed the second end of piping around the body of the cracked pipeline, waiting for the remote command, for tightly fixing by heat shrinking and vulcanization;

FIG. 19 top view of the formed flexible piping, wherein both ends of the piping are tightly fixed by heat shrinking and vulcanization onto the body of the cracked pipeline, on one side and the other of the crack, waiting for the command for completely closing to antagonistic zippers;

FIG. 20 top view of the flexible piping having both ends fixed by heat shrinking and vulcanization onto the body of the cracked pipeline, wherein, by approaching and sealing all the strips by completely closing the antagonistic zippers by means of the robotic closing sliders, the flexible piping is sealed around the body of the cracked pipeline, going to stop the discharge;

FIG. 21 top view of the flexible piping with all zippers tightly closed, completely sealed and molded on the body of the cracked pipeline, by remotely electrically commanded heat shrinking and vulcanization.

The piping claimed by the invention is made of a number n≥1 flexible strips A, with lengths and widths conveniently selected depending mainly on the diameter of a broken or cracked pipeline 1, wherethrough a pressurized fluid is transported, preferably in an aquatic environment.

A strip A consisting of a layer 2 of heat shrinkable materials, known per se, such as polyolefins, with a shrinkage ratio of at least 3:1 and a heat shrinkage temperature from ≥70° C. up to ≥150° C., the shrinkage taking place in a transverse plane, the material having optimum parameters of flexibility, fire resistance, mechanical strength, highly flame-retardant, abrasion resistance, resistance to the action of corrosive chemical agents and solvents, resistance to ultraviolet rays, with practical applicability in continuous operations carried out in the thermal spectrum ranging from −40° C. up to +125°. In the layer 2 of the strips A there are placed some networks 3 of independent, flexible, sectored electrical heating resistances, power supplied by means of some connecting terminals 4 for multiple functions from an external electric power source, not represented in the figures.

There are also provided some inserts 5 and 6 preferably made of aramid fibers embedded in layer 2, of heat-shrinkable material, conveniently positioned in the layer adjacent to the networks 3 of electrical heating resistances, these inserts having a reinforcing role, joining in the transversal plane the toothed zipper rails provided on either side of the strips.

On each of the lateral sides a and b of the strips A there are fixed some liquid tight & gas tight antagonistic toothed zipper rails 7 and 8, arranged one in the extension of the other, preferably unequal, placed face to face with other toothed rails 7 and 8 of an adjacent strip A, in order to be joined together by means of some robotic sliders 9 and 10 of some liquid tight zippers B and C. Between the toothed rails 7 and 8 there are placed some limit stops 11 and 12 of the robotic sliders 9 and 10 with antagonistic operation direction.

Each robotic slider 9 and 10 (element known per se) is provided with electric motor, electric circuits, transmission mechanisms and drive mechanisms of some gears which generate the movement along the toothed zipper rails 7 and 8 based on some commands remotely transmitted by means of some cables not represented in the figures, connected to some terminals 25 and 26 for multiple commands and for the safety of operation there are provided some gears 27, which by rotating clockwise or trigonometrically allow the mechanical operation of the sliders movement by means of one ROV, or by an operator. Each strip A is provided with maneuvering eyelets 23 and with purging system 24.

Along the pathways of the toothed rails 7 and 8 there are mounted some circuits 13 for indicating the position of each of the sliders 9 and 10 along the tight zippers.

At the external side, the strip A has a protective layer 14 made of a thermally insulating plastic material, such as, for example, neoprene, which has the main role of conserving the thermal energy necessary for heat shrinking, and at the inner side the strip A has a thermally activable solid adhesive layer 15, which tends to be liquefied at the temperature developed by the networks 3 of electrical heating resistances, finally achieving a vulcanization of the strip A on the body of the pipelines 1 and 20 that it will be in contact with, ensuring a secure and lasting sealing.

At the ends of each strip A there are mounted some front and rear magnetic inserts 16 and 17, and some front and rear inserts 18 and 19 with elements made of a shape memory material, such as, for example, electroactive polymers that can generate a curvature in the cross-sectional plane by the application of a command consisting of an electric impulse.

The process claimed by the invention which uses the piping for an intervention on a broken pipeline, with discontinuous body, can be carried out by means of a ROV in subaquatic environment and comprises:

in a first step, joining between them on a relatively short portion, from some front ends c and rear ends e some strips A that will form the piping by moving the sliders 9 and 10 on a relatively short distance along the toothed zipper rails 7 and 8, based on some commands transmitted by means of some cables, not represented in the figures, connected to some terminals 25 and 26 for multiple commands.

In the second step, by means of a ROV, the front ends c of the strips A partially joined together are mounted by wrapping around the body of a suction pipe 20 of a pump 21 to which there is connected a pipe 22 for pushing the recovered fluids towards a tank known per se, not represented in the figures. Concomitantly, through a remote electric command transmitted through the terminals 4, by means of some cables not represented in the figures, there is actuated the curvature in the transversal plane of the elements 18 made of shape memory materials, so that, together with the effect of the magnetic inserts 16 to facilitate the operation of applying and fixing the strips on the body of the suction pipe 20. After joining the last lateral parts a and b of the strips A, for closing the last short zipper B remained open, the movement of the robotic sliders 9 along the toothed zipper rails 7 on a conveniently selected portion towards the limit stops 11 is actuated based on some commands transmitted by means of some cables, not represented in the figures, connected to some terminals 25 for multiple commands. The strips A are also provided with networks 3 of electrical heating resistances in the portion up to the limit stops 11.

In the third step, the front ends c of the strips A are mounted on the suction pipe 20, and have all the short zippers B closed on a convenient portion in relation to the suction pipe 20 length, and the sectored networks 3 of electrical heating resistances in this portion are switched on selectively, gradually and differentiated towards the end stops 11, that results in gradual and differentiated heat shrinking on a certain portion of the front ends c of the strips A, so that a firm attachment on the desired portion in the body of the suction pipe 20 is obtained, with which there also comes into contact the layer of solid adhesive activated by heating the networks 3 of electrical heating resistances, electrically commanded by means of some cables, not represented in the figures, connected to the terminals 4, thereby a precise molding and vulcanization of the piping being obtained on the body of the suction pipe 20, regardless of the dimension differences these may present. Finally, there is turned off the power supply of the networks 3 of electrical heating resistances in the region on which the heat shrinking was commanded.

In the fourth step, an end d of the damaged, broken pipeline 1 is wrapped around by the rear ends e of the strips A, by means of one ROV. Concomitantly, by means of an electric command transmitted through the terminals 4 by means of some cables not represented in the figures, the curvature in the transverse plane of the elements 19 made of shape memory materials is actuated, so that, together with the magnetic inserts 17 there is facilitated the operation of applying the strips onto the body of the damaged pipeline 1. After joining the last lateral parts a and b at the end e of the strips A, closing the last long zipper C remained free is carried out by moving the robotic sliders 10 along the toothed zipper rails 8 on a portion conveniently selected towards the limit stops 12, based on some commands transmitted by means of some cables not represented in the figures, connected to some terminals 26 for multiple commands.

In the fifth step, the rear ends of the strips A are mounted on the damaged pipeline 1, and have all zippers C closed on a conveniently selected portion in relation to the length and shape of the end d of the damaged pipeline 1, and the sectored networks 3 of electrical heating resistances in this portion are switched on selectively, gradually and differentiated, towards the limit stops 12, which results in gradual and differentiated heat shrinking on a certain portion of the strips A, so as to obtain a firm attachment on the desired portion of the end d of the damaged pipeline 1, with which there also comes into contact the solid adhesive layer 15 activated by heating the networks 3 of electrical heating resistances, commanded by means of some cables not represented in the figures, connected to the terminals 4, thus obtaining a precise molding and vulcanization of the piping onto the body of the damaged pipeline 1, regardless of the dimension differences these may have. Finally, there is turned off the power supply of the networks 3 of electrical heating resistances in the region on which the heat shrinking was commanded.

In the sixth step, there is commanded in a centralized manner the movement preferably simultaneous of all the sliders 9 and 10 up to the contact thereof with the limit stops 11 and 12, so that all zippers B and C are closed completely, moment in which the fluid flow coming out through the end d of the damaged pipeline 1 is sucked through the pipe 20 by the pump 21, which creates a controlled depression in the flexible and impervious piping pushing the captured fluid into the pipeline 22.

In another embodiment, the process claimed by the invention, which uses the piping for an intervention to a cracked pipeline or to restore a cable insulation integrity, may be carried out by means of a ROV in subaquatic environment or with the help of a human operator in case of the intervention in the terrestrial environment, and comprises in a first step, joining together on a relatively short portion, from some front ends c and rear ends e of some strips A that will form the piping by the movement on a relatively short distance of the sliders 9 and 10 along the toothed zipper rails 7 and 8, based on some commands transmitted by means of some cables, not represented in the figures, connected to some terminals 25 for multiple functions.

In the second step, the front ends c of the strips A joined partially between them are applied by wrapping around the body of the cracked pipeline 1, by means of a ROV, at a security distance, conveniently selected, in relation to the cracked region. Concomitantly with the operation of placing the ends c of the strips A around the cracked pipeline, through a remote electric command by means of the terminals 4 by means of some cables not represented in the figures, there is actuated the curvature in the transverse plane of the elements 18 made up of shape memory materials, so that, together with the effect of the magnetic inserts 16 to generate a combined effect to facilitate the operation of fixing the strips onto the body of the cracked pipeline 1. After joining the last parts a and b from the end e of the strips A, for closing the zippers B remained free, the movement of the robotic sliders 9 along the toothed zipper rails 7 on the portion up to the limit stops 11 is actuated based on some commands transmitted by means of some cables, not represented in the figures, connected to some terminals 25 for multiple functions.

In the third step, the front ends c of the strips A wrapped around the cracked pipeline have all the zippers B closed on a portion conveniently selected, and the sectored networks 3 of electrical heating resistances in this portion are switched on selectively, gradually and differentiated, towards the limit stops 11, which results in the gradual and differentiated heat shrinking on a certain portion of the strips A, so as to obtain a firm attachment on the desired portion of the cracked pipeline, with which there also comes into contact the solid adhesive layer 15 activated by heating the networks 3 of electrical heating resistances, electrically commanded by means of some cables, not represented in the figures, connected to the terminals 4, to obtain precise molding and a vulcanization of the pipeline end on a portion of the body of the cracked pipeline. Finally, there is turned off the electric power supply of the networks of electrical heating resistances 3 in the region upon which the heat shrinking was commanded.

In the fourth step, by means of a ROV, the rear ends e of the strips A partially joined between them are applied by wrapping around the body of the cracked pipeline, on the other side of the damaged, cracked region. Concomitantly with the operation of placing the ends d of the strips A around the cracked pipeline, through a remote electrical command through the terminals 4 by means of some cables not represented in the figures, the curvature in the transverse plane of the elements 19 made up of shape memory materials, so that, together with the effect of the magnetic inserts 17 to generate a combined effect in order to facilitate the operation of fixing the strips onto the body of the cracked pipeline. After joining the last parts a and b from the end a of the strips A, for closing the last long zipper C remained free, the movement of the robotic sliders 10 along the toothed zipper rails 8 on the portion up to the limit stops 12 is actuated based on some commands transmitted by means of some cables, not represented in the figures, connected to some terminals 26 with/for multiple functions.

In the fifth step, the rear ends e of the strips A are mounted onto the damaged pipeline 1 and have all the zippers C closed on a conveniently selected portion, and the sectored networks 3 of electrical heating resistances in this portion are turned on selectively, gradually and in a differentiated manner, towards the limit stops 12, which results in gradual and differentiated heat shrinking on a certain portion of the strips A, so as to obtain a firm attachment on the desired portion of the cracked pipeline, with which there also comes into contact the solid adhesive layer 15 activated by heating the networks 3 of electrical heating resistances, electrically commanded by means of some cables, not represented in the figures, connected to the terminals 4, to obtain thus a precise molding and a vulcanization of the second end of the piping on a portion of the cracked pipeline body. Finally, there is turned off the electric power supply of the networks 3 of electrical heating resistances in the region on which the heat shrinking was commanded.

In the sixth step, there is commanded, in a centralized manner, preferably simultaneous movement of all the sliders 9 and 10 along the toothed zipper rails 7 and 8 up to the contact thereof with the limit stops 11 and 12 so that all the zippers and C are closed completely, moment in which the fluid flow coming out through the crack is retained inside the tight piping that was created thus way, thus stopping the discharge.

In a last step (the seventh step) there can be carried out the complete heat shrinking of the whole piping on the body of the cracked pipeline or a cable with damaged insulation, in a peristaltic manner, by the commanded heating in a gradual way, selectively and conveniently selected, of the networks 3 of electrical heating resistances, electrically commanded by means of some cables not represented in the figures, connected to the terminals 4, to obtain this precise molding and a vulcanization of the second end of the piping onto the entire body of the cracked pipeline or onto the cable with damaged insulation. Finally, there is switched off the electric power supply of the networks 3 of electrical heating resistances in the region in which the heat shrinking was commanded in centralized manner and there are isolated the purges 24 wherethrough the fluids were drained between the body of the cracked pipeline and the flexible piping, during the peristaltic movement generated by the controlled heat shrinking from the region of both ends towards the limit stops 11 and 12.

The invention claimed is:

1. Flexible piping for capturing accidental pressurized fluid leaks from a damaged pipeline, which consists of a number n of flexible strips, each provided with at least one layer of heat shrinkable materials in which there are incorporated some networks of independent electrical heating resistances, together with some reinforcing inserts, on the lateral sides of two adjacent strips there being mounted some toothed rails of a fluid tight zipper, wherein on the lateral sides of two adjacent strips (A) there are mounted some toothed rails (7 and 8) arranged one in the extension of the other on each margin, which belong to two antagonistic fluid tight zippers (B and C), driven by means of some robotic closing sliders (9 and 10), with electromechanical actuators incorporated, and at both ends of each strip (A) there are mounted some internal magnetic inserts (16 and 17) and some inserts (18 and 19) made up of a shape memory material which generates a transverse curvature of the strips by the application of a command transmitted by means of an electric or thermal impulse.

2. Piping according to claim 1, wherein the electromechanical actuators of the closing sliders (9 and 10) are equipped with electric motors mechanically coupled to a mechanical pinion gear, which by moving clockwise in a trigonometric sense, allow the controlled linear movement of the closing sliders (9 and 10) along the toothed rails of the zippers (B and C) in both directions, being capable of opening or closing the fluid tight zippers (B and C) based on some electric commands transmitted by an operator.

3. Piping according to claim 1, wherein each of the closing sliders (9 and 10) is provided with an electronic circuit (13) with communication module incorporated, which emits electronic signals and data for determining the exact position of the closing sliders (9 and 10) along the toothed fluid tight zipper rails (7 and 8), and for commanding the back and forward movement of the closing sliders (9 and 10).

4. Piping according to claim 1, wherein each strip (A) comprises an external protective layer (14) made up of a flexible, thermal insulating plastic material, as well as a solid adhesive layer (15) which is thermally activable during the heat shrinking, which is at the lower side, in order to come into contact with the pipeline (1).

5. Piping according to claim 1, wherein the two fluid tight zippers (B and C) mounted one in the extension of the other are unequal in length, and between the toothed zipper rails (7 and 8) there are mounted some limit stops (11 and 12).

6. Process for capturing accidental pressurized fluid leaks from a broken pipeline, which uses a flexible piping according to claim 1, for redirecting the fluid flow towards the desired region or towards a storage tank, optionally provided with a pump (21) in order to create a depressurization of the flexible piping, wherein the following steps:

joining between them on a relatively short portion from the front ends (c) and from the rear ends (e) of the adjacent strips (A) that will form the piping, by joining the parts (a) with the parts (b) of the toothed zipper rails (7 and 8) and moving the sliders (9 and 10) on a conveniently selected distance along the rails (7 and 8) towards the limit stops (11 and 12) of the antagonistic zippers (B and C), by commands applied to the terminals (25 and 26), of the sliders (9 and 10);

assembling together by interconnecting and wrapping around a pipeline (20) connected on a storage tank or to a pump (21) one end (c) of the flexible strips (A) in front of which there are joined together in plane, so that, on this pipeline there are superimposed a number of 3 up to 5 networks of electrical heating resistances (3) provided in front of the short zippers (B), thereafter, in the condition in which the shape memory material inserts (18) are curved by commands applied to the terminals (4), and the magnetic inserts (16) positioned at this end (c) of the strips (A) are fixed on the pipeline (20), by applying a command to the terminals (25) there is commanded the movement of a slider (9) along the tooted rail (7) of the zippers (B) towards the limit stops (11), and subsequently, by the commands applied to the terminals (25) of all sliders (9), these are moved on a conveniently selected portion towards the limit stops (11);

applying voltages are applied to the terminals (4) of the networks of electrical heating resistances (3) for the heat shrinking and gradual molding of the layers (2) of heat shrinkable materials of the strips (A) and implicitly, for fluidization of the adhesive layers (15) provided to the inner side thereof, until obtaining a complete molding and a vulcanization of this end of the flexible piping to the body of the pipeline (20) connected to a tank or to a pump (21);

assembling together by interconnecting and wrapping around a broken pipeline (1) of the other end (e) of the flexible strips (A) in front of which they are joined in plane, so that, there are superimposed a number of 3 up to 5 networks of electrical heating resistances (3) provided in front of the long zippers (C), thereafter, in the condition in which the inserts (19) of shape memory materials are curved by commands applied to the terminals (4), and the magnetic inserts (17) positioned at this end (2) of the strips (A) are fixed on the pipeline (1), by applying a command to the terminals (26) of a slider (10), there is commanded the movement thereof along the toothed rails (8) of the short zippers (C) towards the limit stops (12);

applying voltages are applied to the terminals (4) of the networks of electrical heating resistances (3) for the heat shrinking and gradual molding of the layers (2) of heat shrinkable materials of the strips (A), and implicitly for the fluidization of adhesive layers (15) provided to the internal part thereof, up to obtaining a complete molding and a vulcanization of this end of the flexible piping on the body of the broken pipeline (1); and commanding in a centralized manner the movement of all robotic closing sliders (9 and 10), along the toothed rails (7 and 8), up to the limit stops (11 and 12) for totally closing all the antagonistic zippers (B and C), longitudinally sealing the flexible piping and having the possibility of creating a controlled depressurization by means of the pump (21) or by means of the purges (23) provided with fast couples to which additional piping can be connected towards the storage tanks.

7. Process for capturing the accidental pressurized fluid leaks from a cracked pipeline, which uses a flexible piping according to claim 1 for creating a tight sleeve around the body of the cracked pipeline, comprising the following steps:

joining between them on a relatively short portion from the front ends (c) and from the rear ends (e) of the adjacent strips (A) that will form the piping, by joining the parts (a) with the parts (b) of the toothed zipper rails (7 and 8) and the movement on a conveniently selected distance of the sliders (9 and 10) along the rails (7 and 8) towards the limit stops (11 and 12) of the antagonistic zippers (B and C), by commands applied to the terminals (25 and 26), of the sliders (9 and 10);

assembling together by interconnecting and wrapping around a cracked pipeline (1), at a conveniently selected distance in relation to the crack, of an end (c) of the flexible strips (A) in front of which these are joined together in the plane, so that, on this pipeline there exists a number of 3 to 5 networks of electrical heating resistances (3) provided in front of the short zippers (B), thereafter, in the condition in which the inserts (18) made up of shape memory materials are curved by commands applied to the terminals (4), and the magnetic inserts (16) positioned at this end (c) of the strips (A) are fixed on the pipeline (1), by applying a command to the terminals (25) there is commanded the movement of a slider (9) along the toothed rails (7) of the short zippers (B) towards the limit stops (11), and subsequently, by commands applied to the terminals (25), of all sliders (9), these can be moved on a conveniently selected portion towards the limit stops (11);

applying voltages are applied to the terminals (4) of the networks of electrical heating resistances (3) for heat shrinking and gradual molding of the layers (2) of heat shrinking materials from the end (c) of the strips (A) and implicitly for the fluidization of the adhesive layers (15) provided on the inner side thereof, up to obtaining a complete molding and a vulcanization of this end (a) of the flexible piping onto the body of the cracked pipeline (1);

assembling together by interconnecting and wrapping around the cracked pipeline (1), at a conveniently selected distance in relation to the crack, of the other end (e) of the flexible strips (A) in front of which these are joined together in plane, so that, on this pipeline there are superimposed a number of 3 to 5 networks of electrical heating resistances (3) provided in front of the long zippers (C), thereafter, in the condition in which the inserts (19) made up of shape memory materials are curved by commands applied to the terminals (4), and the magnetic inserts (17) positioned at this end (e) of the strips (A) are fixed on the pipeline (1), by applying a command at the terminals (26) there is commanded the movement of a slider (10) along the toothed rails (8) of the long zippers (C) towards the limit stops (12), and subsequently, by commands applied to the terminals (26), of all sliders (10), these are moved on a conveniently selected portion towards the limit stops (12);

applying voltages are applied to the terminals (4) of the networks of electrical heating resistances (3) for heat shrinking and gradual molding of the layers (2) made up of heat shrinkable materials at the end (e) of the strips (A) and implicitly for the fluidization of the layers of adhesive (15) provided on the inner side thereof, up to obtaining a complete molding and a vulcanization of the second end of the flexible piping onto the body of the cracked pipe (1);

commanding in a centralized manner the movement of all robotic closing sliders (9 and 10), along the toothed rails (7 and 8) up to the limit stops (11 and 12), for total closing of all antagonistic zippers (B and C), sealing the flexible piping longitudinally onto the body of the cracked pipeline (1); and applying commands and voltages to the terminals (4) of the networks of electrical heating resistances (3) for heat shrinking and gradual molding of the layers (2) of heat shrinkable materials of the strips (A), generating in a controlled manner by a peristaltic movement, from both ends towards the purges provided on each strip, the elimination of fluids between the body of the cracked pipeline (1) and obtaining by heat shrinking a complete molding and a vulcanization of the strips (A) by the fluidization of the adhesive layer (15) provided on the inner side thereof.

\* \* \* \* \*